(12) United States Patent
Zhao et al.

(10) Patent No.: US 12,204,612 B1
(45) Date of Patent: Jan. 21, 2025

(54) OPTIMIZED BIAS SELF-DETECTION BASED ON PERFORMANCE AND IMPORTANCE

(71) Applicant: International Business Machines Corporation, Armonk, NY (US)

(72) Inventors: Ze Ming Zhao, Beijing (CN); Peng Hui Jiang, Beijing (CN); Xiao Tian Xu, Chang De (CN); Wenjing Liao, Beijing (CN); Zhi E. Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 18/343,164

(22) Filed: Jun. 28, 2023

(51) Int. Cl.
G06F 18/23213 (2023.01)
G06F 16/28 (2019.01)

(52) U.S. Cl.
CPC ...... *G06F 18/23213* (2023.01); *G06F 16/285* (2019.01)

(58) Field of Classification Search
None
See application file for complete search history.

(56) References Cited

U.S. PATENT DOCUMENTS

| | | | | |
|---|---|---|---|---|
| 10,705,492 | B2 * | 7/2020 | Harvey | G05B 17/02 |
| 11,151,880 | B1 * | 10/2021 | Shou | G08G 1/0141 |
| 11,392,096 | B2 * | 7/2022 | Harvey | G05B 15/02 |
| 2020/0348632 | A1 * | 11/2020 | Harvey | G05B 13/0265 |
| 2021/0003412 | A1 * | 1/2021 | Xu | H04L 12/185 |
| 2021/0174222 | A1 | 6/2021 | Dodwell et al. | |
| 2022/0012591 | A1 | 1/2022 | Dalli et al. | |
| 2022/0101146 | A1 | 3/2022 | el Kaliouby et al. | |
| 2022/0108445 | A1 * | 4/2022 | Zhang | G06V 20/20 |
| 2022/0172099 | A1 | 6/2022 | Das et al. | |
| 2022/0350297 | A1 * | 11/2022 | Harvey | G05B 13/048 |
| 2023/0116807 | A1 * | 4/2023 | Choi | F24F 11/30 700/276 |
| 2024/0281435 | A1 * | 8/2024 | Chen | G06F 16/285 |
| 2024/0331311 | A1 * | 10/2024 | Sui | G06T 19/006 |

OTHER PUBLICATIONS

The Analysis of a Simple k-Means Clustering Algorithm.*
Zhe Zhang et al., "Identifying Significant Predictive Bias in Classifiers," Dated: Jul. 4, 2017, pp. 1-5, arXiv:1611.08292v2 [stat.ML].

* cited by examiner

*Primary Examiner* — Kim T Nguyen
(74) *Attorney, Agent, or Firm* — Patterson + Sheridan, LLP

(57) ABSTRACT

Embodiments of the present disclosure provide systems and methods for implementing self-bias detection based on performance and importance. A disclosed computer implemented method aggregates continuous input data through a K-means clustering algorithm to reduce the number of aggregated sub-group data pairs, enabling a reduced calculation time for computing bias and enhanced performance. The self-bias detection identifies a scale factor and a balance factor of aggregated sub-group data pairs, which indicate the importance of the detected bias.

20 Claims, 7 Drawing Sheets

INPUT DATA D 400 WITH CONTINUOUS DATA FEATURE F

| FEATURE 402 | LABEL 404 |
|---|---|
| 23 | NO RISK |
| 46 | RISK |
| 17 | RISK |
| * * * | * * * |
| 26 | RISK |
| 59 | NO RISK |

SUB-GROUPS 500 AND ITEM NUMBERS 502

2-23    NUMBER 240
23-37   NUMBER 560
* * *
55-73   NUMBER 56

SUB-GROUPS DATA D' 600

| FEATURE 602 | LABEL 604 |
|---|---|
| 2-23 | NO RISK |
| 42-55 | RISK |
| 2-23 | RISK |
| * * * | * * * |
| 23-37 | RISK |
| 55-73 | NO RISK |

BASE BIAS 700 BASED ON SUB-GROUP PAIRS

| SUB-GROUP PAIRS 702 | BASE BIAS 704 | SCALE FACTOR 706 | BALANCE FACTOR 708 |
|---|---|---|---|
| 2-23 VS 23-37 | 1.1 | 210 | 0.42 |
| 2-23 VS 42-55 | 1.3 | 305 | 0.83 |
| *** | *** | *** | *** |
| 42-55 VS 55-73 | -0.6 | 36 | 0.7 |

FIG. 7

NEW BIAS 800 WITH WEIGHT BASED ON SCALE FACTOR AND BALANCE FACTOR

| SUB-GROUP PAIRS 802 | NEW BIAS 804 |
|---|---|
| 2-23 VS 23-42 | 1.0 |
| 2-23 VS 42-55 | 1.5 |
| *** | *** |
| 42-55 VS 55-73 | -0.9 |

FIG. 8

OPTIMIZED BIAS SELF-DETECTION BASED ON PERFORMANCE AND IMPORTANCE

BACKGROUND

The present invention relates to computer systems, and more specifically, to systems and methods for self-bias detection based on performance and importance.

Fairness is a new dimension for evaluating artificial intelligence (AI) models and services. With the widespread application of AI technology, ensuring that AI models and services provide credible and fair services is an increasingly important issue. Existing bias detection methods typically rely heavily on manually specified features, privileged and unprivileged groups. Existing bias detection performance may be unacceptable for continuous data due to prohibitive data processing time required. While detected biases may have different importance, existing bias detection methods fail to quantify importance of the detected bias. A need exists for new techniques for self-bias detection.

SUMMARY

Embodiments of the present disclosure provide systems and methods for implementing self-bias detection based on performance and importance.

A non-limiting disclosed method comprises receiving input data with a continuous data feature. The input data comprises a data pair of a feature value and a label name. The system aggregates the input data into sub-groups by applying a K-means clustering algorithm to provide aggregated sub-group data. The system computes a base bias based on two or more pairs of the aggregated sub-group data. The system collects a scale factor and a balance factor for the two or more aggregated sub-group data pairs. The system computes a new bias, based on the computed base bias for the two or more aggregated sub-group data pairs, with a weight based on the scale factor and the balance factor of the aggregated sub-group data pairs. The system identifies a final bias based on the computed new bias. The system provides an output of the final bias based on the largest calculated new bias.

Other disclosed embodiments include a computer system and computer program product for implementing self-bias detection based on performance and importance, implementing features of the above-disclosed methods.

BRIEF DESCRIPTION OF THE DRAWINGS

FIG. 7 illustrates examples of a calculated base bias based on sub-group data pairs of one or more disclosed embodiments;

FIG. 8 illustrates examples of a calculated new bias based on the calculated base bias with weight based on scale factor and the balance factor of one or more disclosed embodiments.

DETAILED DESCRIPTION

Figure 1:
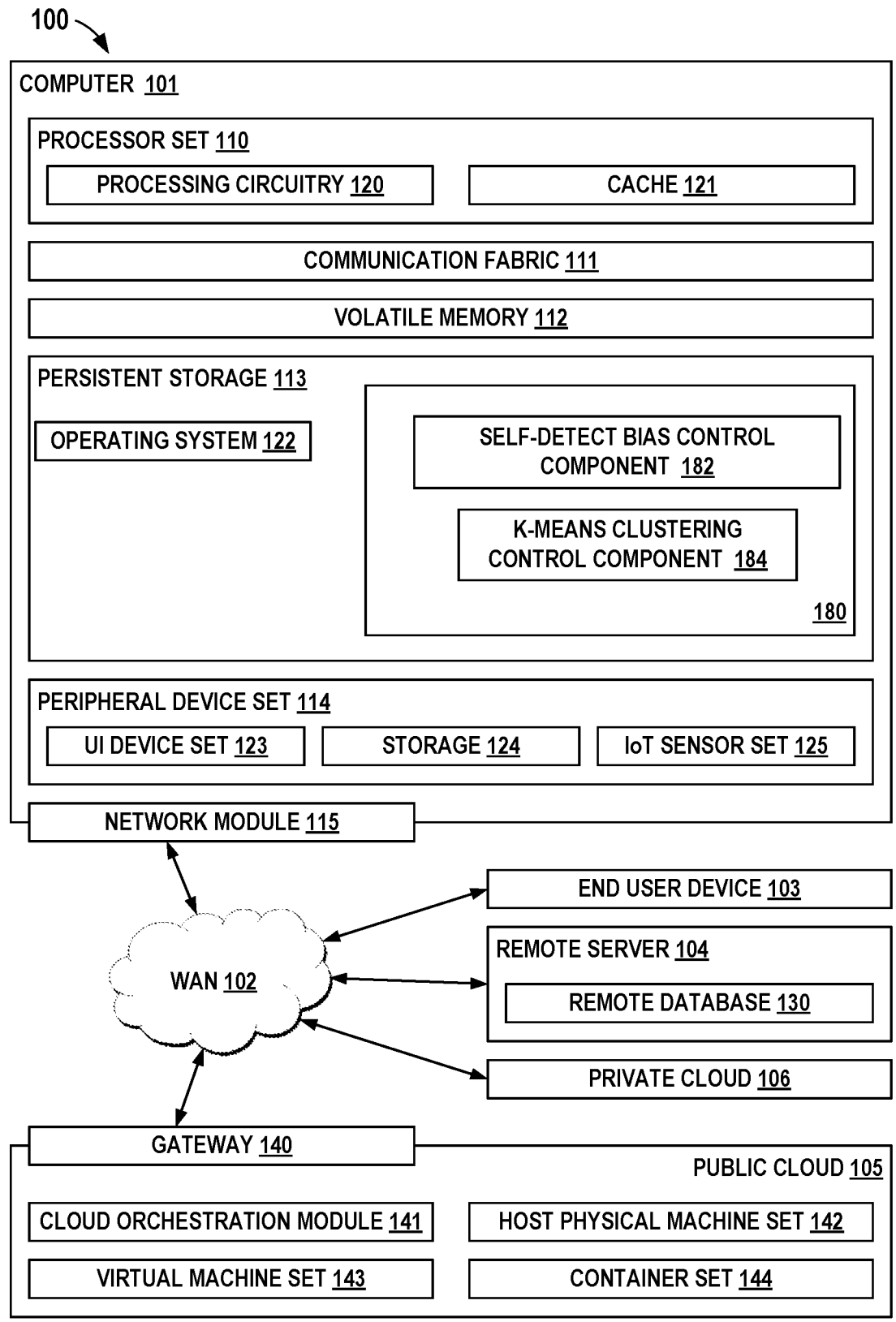
FIG. 1 is a block diagram of an example computer environment for use in conjunction with one or more disclosed embodiments for implementing bias self-detection based on performance and importance.

Embodiments of the present disclosure provide systems and methods for implementing self-bias detection based on performance and importance. The disclosed systems and methods enable identifying more important biases or optimized biases for training data in less time substantially without relying on the human experience. A disclosed computer implemented method aggregates input data through a K-means clustering algorithm to reduce a number of aggregated sub-group data pairs for bias calculations, enabling a reduced calculation time for computing bias and enhanced performance. The self-bias detection is based on a scale factor and a balance factor between aggregated subgroup data pairs, which enables efficient and effective analysis of the importance of the self-detected bias.

In a disclosed embodiment, the input data with the continuous bias feature is aggregated through the K-means clustering algorithm to reduce the number of subgroups used when comparing biases in pairs to compute a base bias, thereby significantly improving the performance of the self-bias detection method on the continuous data. In this process, the system can iteratively correct the K-means clustering by merging adjacent sub-groups and updating a K' value. The refined K' value for an identified final bias is saved in the K-value center data store. When datasets of input data with the same feature type arrive in the future, the refined K' value can be applied to the K-means clustering algorithm, which can enable improved performance. In a disclosed embodiment, a scale factor and a balance factor between aggregated sub-group data pairs are identified to measure an importance of the detected bias. In comparison with conventional bias detecting arrangements, using the K-means clustering algorithm and the scale and balance factors provides improved performance with the calculation time significantly reduced and identifies importance of the detected final bias. Disclosed embodiments can provide both better performance than existing methods and more meaningful detected bias by considering size of the value groups identified with the scale and balance factors. For example, bias between major groups and others, especially between two major groups, can have higher importance, where a major group means the value group that has a large number of data elements. Disclosed embodiments do not require users to have significant prior experience. In a disclosed embodiment, the users can specify a K-value for the K-means algorithm for sub-group clustering, while on premise or self-learned K-values can be applied.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as a Self-Detect Bias Control Component 182 and a K-Means Clustering Control Component 184, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure provide systems and methods for implementing enhanced self-bias detection based on performance and importance. Disclosed embodiments of self-bias detection enable identifying more important biases or optimized biases for training data with reduced time substantially without relying on the human experience.

Disclosed embodiments of self-bias detection provide enhanced performance relative to existing bias detection methods. Disclosed embodiments of self-bias detection can substantially reduce a value group number of input data features to minimize the number of bias calculations performed, while identifying the importance of biases. Disclosed embodiments of self-bias detection are implemented without requiring prior experience of users.

A disclosed method comprises receiving input data with a continuous data feature. The input data comprises feature and label input data pairs. For example, the input data includes the continuous data feature with a label of Risk or No Risk. The system aggregates the input data into sub-groups by applying a K-means clustering algorithm to provide aggregated sub-group data pairs. The system can use a user defined K input for the data sub-group clustering, or the K input can be obtained from a K-value center data store. The K-value center data store can store self-learned K-values from historical bias detection of disclosed embodiments. The system computes a base bias for the sub-group data pairs and collects a scale factor and a balance factor of the sub-group data pairs. The system computes a bias from the computed base bias for the sub-group data pairs with a weight based on the scale factor and balance factor of the bias sub-group data pairs. The system can identify a final bias based on merging adjacent sub-groups to provide aggregated sub-group data pairs for the merged sub-groups, and repeating the base bias calculations and the bias calculations, to identify an optimal final bias. The system outputs the final bias including the scale factor and balance factor of the sub-group data pairs. The system updates an identified K value for the final bias stored in a K-value center data store including a feature name for the updated K value.

Figure 2:
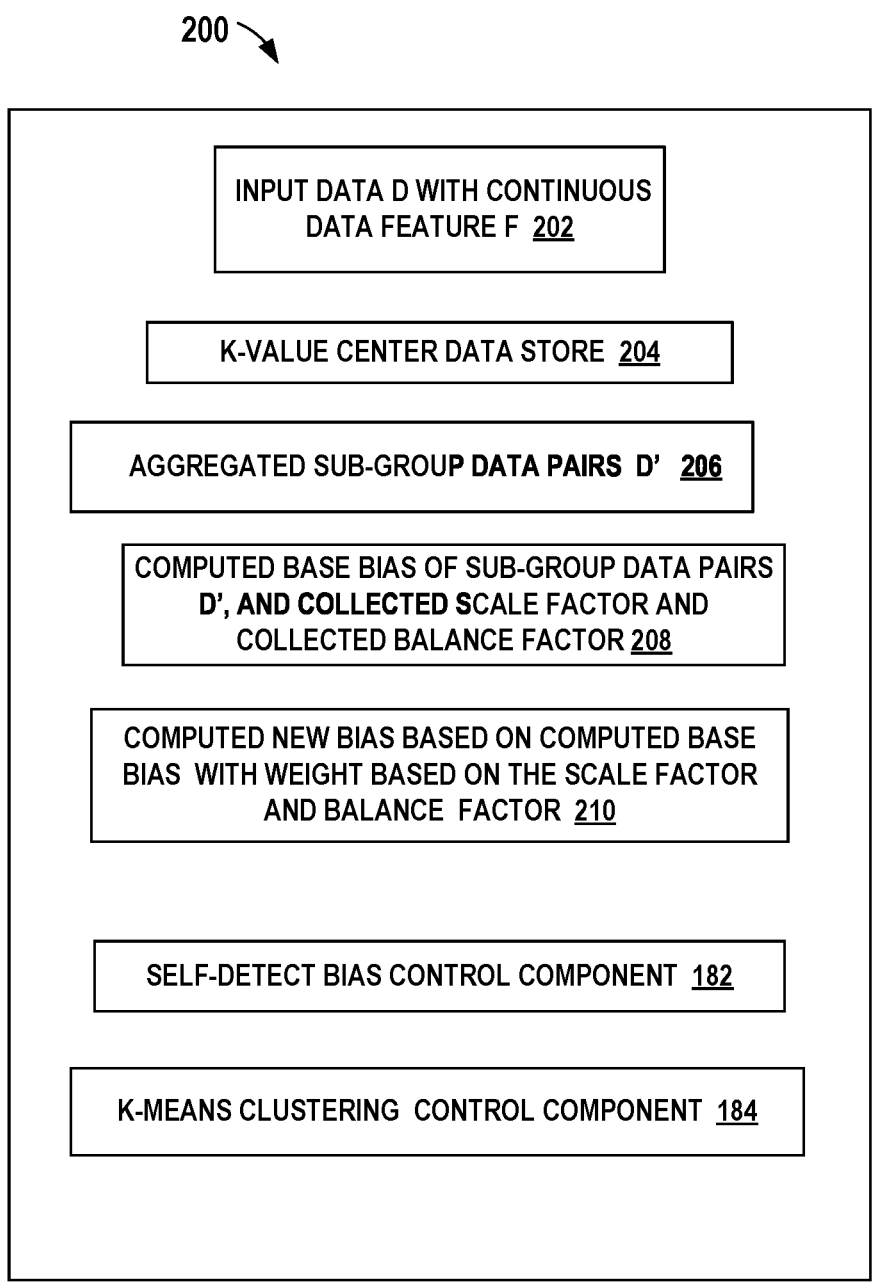
FIG. 2 is a block diagram of an example system illustrated with example input data and calculated data for implementing bias self-detection based on performance and importance of one or more disclosed embodiments.

FIG. 2 illustrates an example system 200 shown with example input data D 202 and calculated or aggregated sub-group pairs of data D' 206 for implementing self-bias detection based on performance and importance of disclosed embodiments. System 200 can be used in conjunction with the computer 101 and cloud environment of the computing environment 100 of FIG. 1 for implementing self-bias detection of disclosed embodiments. System 200 includes advantages enabled by using the Self-Detect Bias Control Component 182 and the K-Means Clustering Control Component 184; for example, including self-aggregation of continuous data with clustering the feature F of input data D 202 into K sub-groups with K-means clustering to provide aggregated sub-group data pairs D' 206. System 200 enables efficient and effective self-bias detection of disclosed embodiments using the reduced number of sub-groups when computing base bias and new bias, thereby improving the performance of the self-bias detection. System 200 optionally merges adjacent sub-groups sequentially to find a largest new bias as a final bias and record the K' value (new sub-group) of the final bias.

System 200 includes a dictionary named K-value center data store 204 provided to automatically recommend the historical best K' as a K-value according to the feature name. System 200 obtains the input data D 202 with continuous data feature F, and implements the aggregated sub-group data pairs D' 206. As shown, system 200 implements computed base bias 208 of aggregated sub-group data pairs D' with collected or recorded scale factor and recorded balance factor and computed new bias 210 with weight based on the recorded scale factor and balance factor. The continuous data feature F of input data D 202 identifies a given bias type to be detected, such as one of multiple protected classes, for example bias based on age, race, gender, and the like.

Figure 3A:
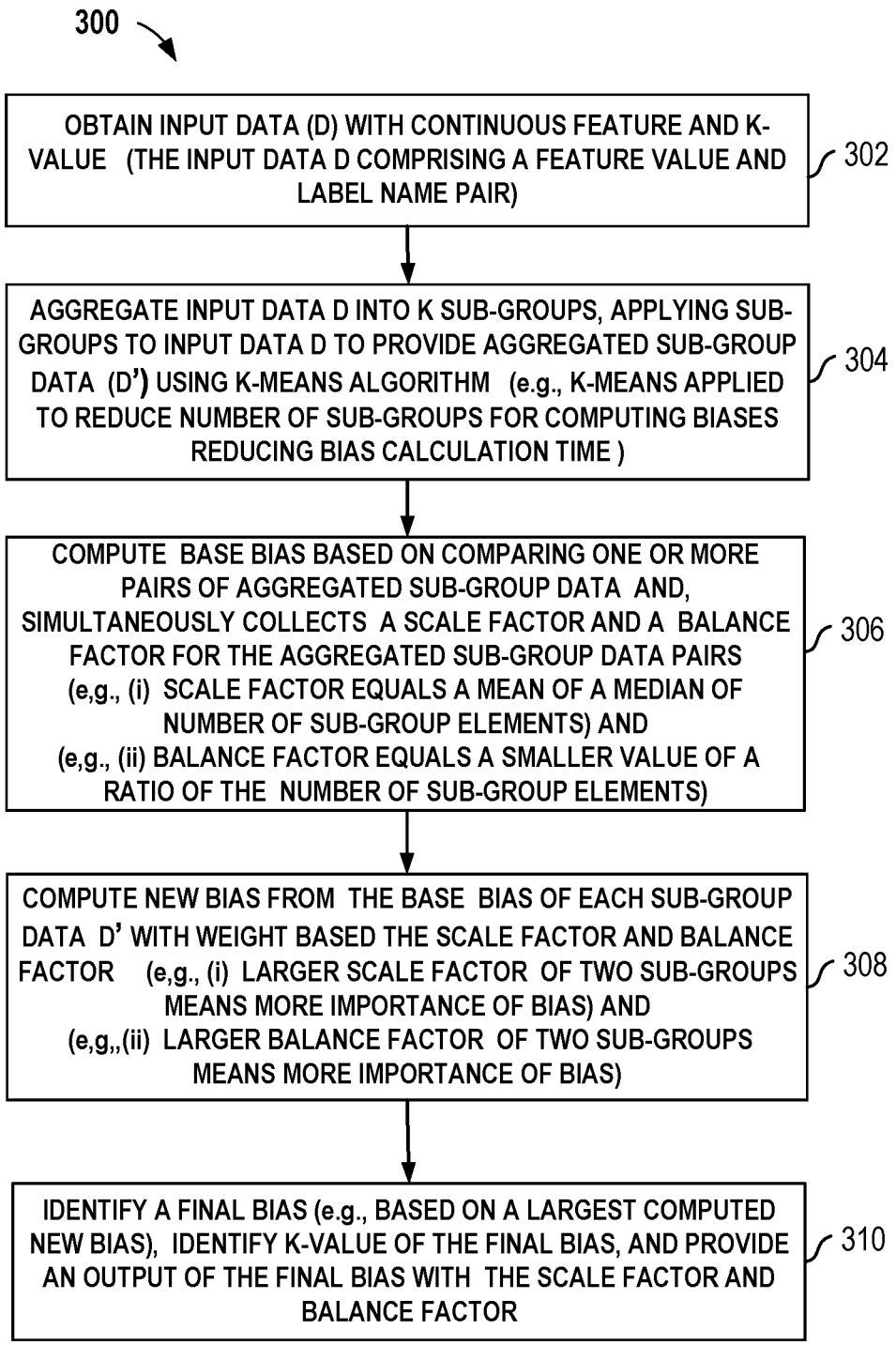
FIGS. 3A and 3B together provides a flow chart of example operations of a method for implementing bias self-detection based on performance and importance of one or more disclosed embodiments.
Figure 3B:
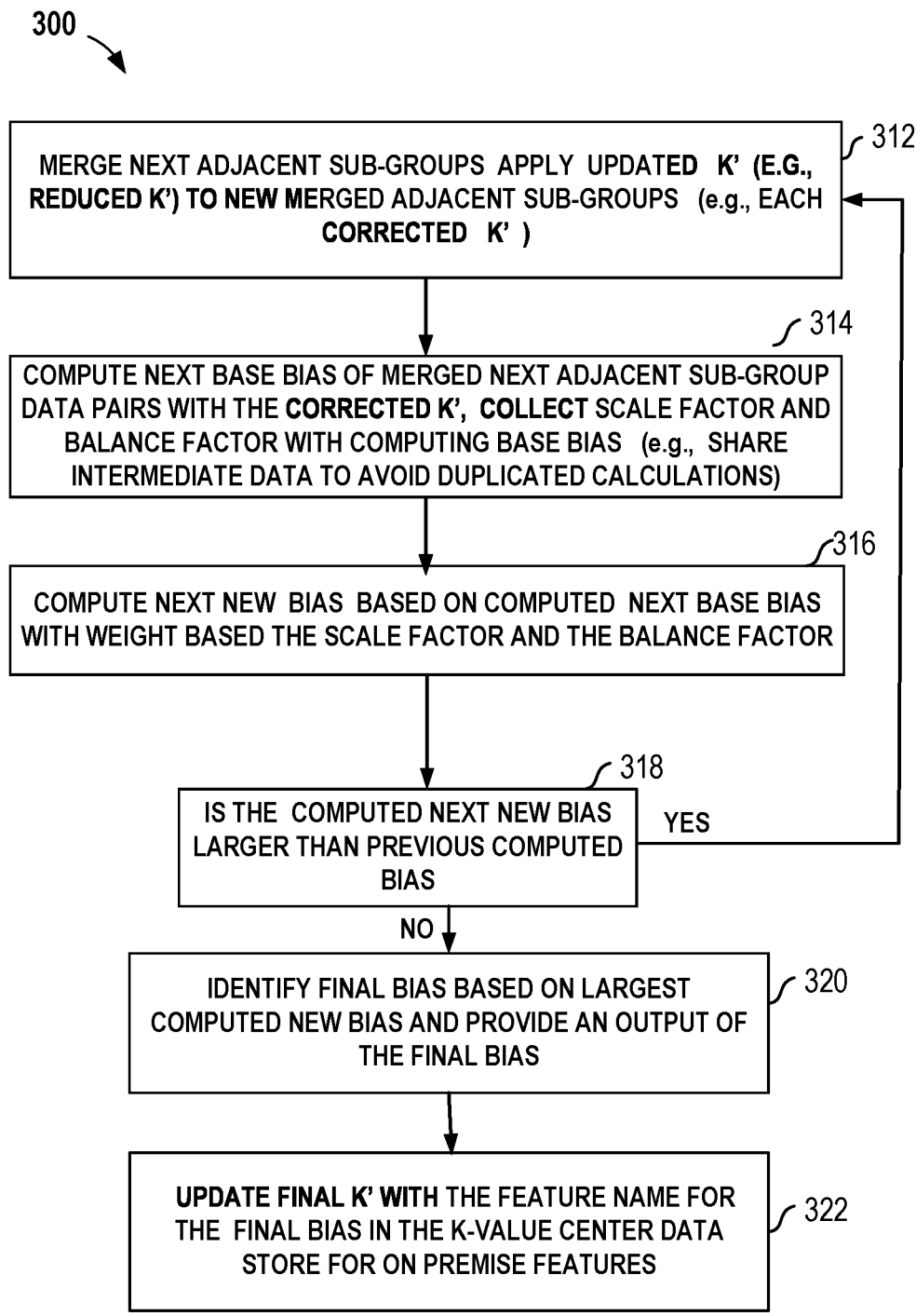

FIGS. 3A and 3B together illustrate example operations of a method 300 for implementing bias self-detection based on performance and importance of one or more disclosed embodiments. For example, method 300 can be implemented by the system 200 in conjunction with the computer 101 of FIG. 1 with the Self-Detect Bias Control Component 182 and K-Means Clustering Control Component 184.

At block 302, system 200 obtains input data D 202 with a continuous feature F and a K value to implement self-aggregation for continuous data, which use a K-means algorithm to cluster continuous data into K sub-groups.

Figures 4, 5, 6:
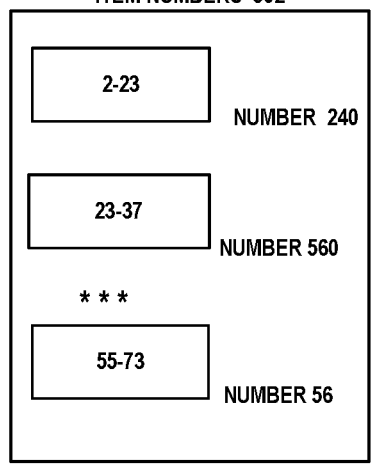
FIG. 4 illustrates example input data D with a continuous feature F of a dataset of one or more disclosed embodiments.
FIG. 5 illustrates examples of multiple sub-group together with example item numbers of one or more disclosed embodiments.
FIG. 6 illustrates an example aggregated sub-group data D' with feature value and label name of one or more disclosed embodiments.

Referring to FIG. 4, an illustrated example input data D 400 provides examples of the input data D 202 with the continuous feature F of one or more disclosed embodiments. As shown, the input data D 400 includes a Feature 402 and Label 404 with examples of features and labels. For example, the Feature 402 may relate to a given age value used for detecting bias, and the Label 404 may relate to an associated attribute of the age Feature 402 indicated by Risk or No Risk.

At block 304, system 200 aggregates continuous input data D 202 with feature F into K sub-groups, applying K sub-groups to the input data to provide aggregated sub-group data pairs D' 204 using a K-means clustering algorithm. For example, the K-means clustering algorithm is a method of vector quantization that can partition N observations into K clusters or sub-groups.

FIG. 5 illustrates multiple examples of sub-groups 500 together with item numbers or element numbers 502. As shown at block 304, system 200 applies the sub-groups to the input data D to provide aggregated sub-group data D'. FIG. 6 illustrates an example of aggregated sub-group data D' 600, such as shown with system 200 in FIG. 2 as aggregated sub-group data pairs D' 206. As shown, the aggregated sub-group data D' 600 includes multiple examples of a feature 602 and label 604. For example, in a disclosed embodiment the aggregated sub-groups data D' comprises discrete data, with no continuous feature.

At block 306, system 200 computes a base bias of aggregated sub-groups data pairs and simultaneously collects a scale factor and a balance factor between subgroups to measure the importance of the bias from the two collected scale and balance factors. System 200 records the collected scale factor and the collected balance factor with the computed base bias at block 210 shown in FIG. 2. In a disclosed embodiment, system 200 can compute the base bias using an existing bias detecting algorithm of various known bias detecting algorithms. In a disclosed embodiment, system 200 achieves enhanced performance by reducing the number of bias detection calculations by providing the aggregated sub-groups data pairs D' 206 through the K-means clustering. The collected scale factor and the collected balance factor are used for calculating a new bias based on the calculated base bias to identify an importance of the computed new bias.

FIG. 7 illustrates a base bias 700 calculated based on sub-groups data pairs, such as sub-groups data pairs D' 206 in FIG. 2. The illustrated calculated base bias 700 include examples of a sub-group pair 702, a calculated base bias 704, a collected scale factor 706, and a collected balance factor 708. For example, (i) the scale factor 706 equals a mean of a median of a number of sub-group elements, and (ii) the balance factor 708 equals a smaller value of a ratio of the number of sub-group elements. For example, the larger the scale factor 706 of the sub-group pairs indicates more importance of the bias. For example, the larger the balance factor 708 of the sub-group pairs indicates more importance of the bias.

At block 308, system 200 computes a new bias based the calculated base bias 700 of the sub-group data pairs with a weight based on the collected scale factor 706 and the collected balance factor 708 of the calculated base bias.

FIG. 8 illustrates an example new bias 800 computed based on the base bias together with weight based on scale factor and the balance factor. As illustrated, the new bias 800 including examples of sub-group pairs 802, and examples of a calculated new bias 804. At block 310, system 200 can identify a final bias, for example based on a largest computed new bias, and provide an output of the final bias. For example, as shown in FIG. 8, the largest calculated new bias 804 equals 1.5 providing the identified final bias. Further at block 310, system 200 can identify a K-value for the identified final bias, for example such as illustrated and described with respect to FIG. 3B. In a disclosed embodiment, the identified K-value is saved to the dictionary named K-value center data store 204.

Referring to FIG. 3B, as shown at block 312 system 200 merges adjacent sub-groups, for example merging two additional adjacent sub-groups using an updated, different specified K-value. For example, an initial specified K-value is K, a next specified K-value is K', and followed by a next specified K-value of K'=K−1 can be used corresponding to the sequentially merged adjacent data sub-groups. In a disclosed embodiment, each sequential next specified K-value for merged adjacent data sub-groups is a smaller value, for example, the initial specified K-value of K equals 5, the next specified K-value of K' equals 4, and the like.

At block 314, system 200 computes a base bias of the merged, adjacent sub-group data pairs and simultaneously collects a scale factor and a balance factor between sub-groups to measure the importance of the bias from the two collected factors. System 200 records the collected scale factor and a balance factor to use for calculating a new bias from the calculated base bias to identify a final bias. At block 316, system 200 computes a new bias based on the calculated base bias of the merged, adjacent sub-group data pairs with a weight based on the collected scale factor and the collected balance factor of the calculated base bias. At block 318, system 200 checks whether the computed new bias is larger than the previously computed bias. When determined that the computed new bias is larger than the previously computed bias, system 200 returned to block 312 to merge next adjacent sub-groups, and continue processing as described above. When determined that the computed new bias is not larger than the previously computed bias, system 200 identifies a final bias based on the largest computed new bias and provides an output of the final bias at block 320. At block 322, system 200 updates the final K-value K' with the feature name for the final bias into the K-value center data store 204 for on premise features. System 200 can identify a future use of a given continuous feature having the same feature name and recommend the K-value K' stored by the K-value center data store 204.

Figure 9:
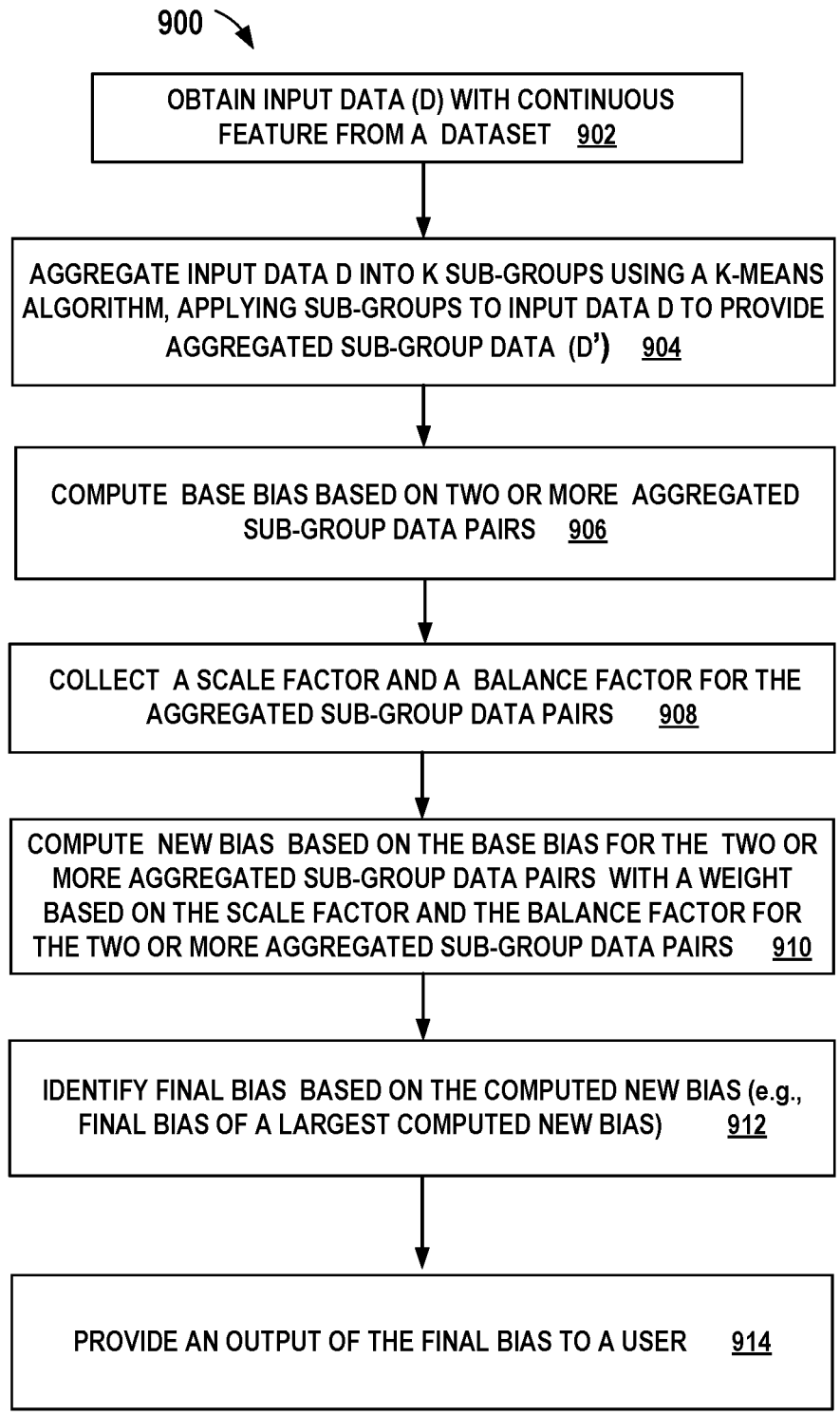
FIG. 9 is a flow chart of an example method for implementing bias self-detection based on performance and importance of one or more disclosed embodiments.

FIG. 9 illustrates an example method 900 for implementing bias self-detection based on performance and importance of one or more disclosed embodiments. The method 900 can be implemented by the system 200 in conjunction with the computer 101 of FIG. 1 with the Self-Detect Bias Control Component 182 and K-Means Clustering Control Component 184.

At block 902, system 200 obtains input data with a continuous data feature, for example from a training dataset.

For example, the input data D 202 comprises a data pair of the feature value 402 and the label name 404 as shown in FIG. 4. At block 904, system 200 aggregates the input data into sub-groups (e.g., such as sub-groups 500 with item numbers 502 as shown in FIG. 5), applying the K-means clustering algorithm to provide aggregated sub-group data D' 206. For example, the aggregated sub-group data D' 206 can be represented by the example aggregated sub-group data D' 600 provided in FIG. 6.

At block 906, system 200 computes a base bias based on comparing two or more aggregated sub-group data pairs. At block 908, system 200 collects a scale factor and a balance factor for the two or more aggregated sub-group data pairs, for example simultaneously with computing the base bias. At block 910, system 200 computes a new bias, based on the computed base bias for the two or more aggregated sub-group data pairs, with a weight based on the scale factor and the balance factor of the aggregated sub-group data pairs. At block 912, system 200 identifies a final bias based on the computed new bias, where the final bias is a largest computed new bias. At block 914, system 200 provides an output of the final bias to a user.

While the foregoing is directed to embodiments of the present invention, other and further embodiments of the invention may be devised without departing from the basic scope thereof, and the scope thereof is determined by the claims that follow.

What is claimed is:

1. A method comprising:
   obtaining input data with continuous feature from a data set;
   applying a K-means clustering algorithm to the input data to provide K sub-groups of aggregated sub-group data;
   computing a base bias based on two or more aggregated sub-group data pairs of the K sub-groups of the aggregated sub-group data;
   collecting a scale factor and a balance factor for the two or more aggregated sub-group data pairs;
   computing a new bias based on the computed base bias with a weight based on the scale factor and the balance factor of the two or more aggregated sub-group data pairs;
   identifying a final bias based the computed new bias of the two or more aggregated sub-group data pairs; and
   providing an output of the final bias to a user.

2. The method of claim 1, further comprising:
   sequentially merging adjacent sub-groups of the aggregated sub-group data, applying an updated K value to the K-means clustering algorithm to provide merged aggregated sub-group data; and for two or more merged aggregated sub-group data pairs, sequentially (i) computing the base bias; (ii) collecting the scale factor and collecting the balance factor; and (iii) computing the new bias.

3. The method of claim 2, further comprises identifying the final bias based on a largest value of the computed new bias for the two or more merged aggregated sub-group data pairs.

4. The method of claim 3, wherein each updated K value includes a K'-value with a feature name, and wherein identifying a final bias further comprises identifying the K'-value for the final bias; and storing the K'-value with the feature name in a K-value center data store.

5. The method of claim 1, wherein applying the K-means clustering algorithm further comprises providing a specified K-value with a feature name to the K-means clustering algorithm and wherein the specified K-value with the feature name is stored in a K-value center data store.

6. The method of claim 1, wherein a value of the scale factor for the two or more aggregated sub-group data pairs indicates an importance of the final bias, where a higher value indicates more importance.

7. The method of claim 1, wherein a value of the balance factor for the two or more aggregated sub-group data pairs indicates an importance of the final bias, where a higher value indicates more importance.

8. The method of claim 1, wherein collecting the scale factor further comprises identifying a mean value of a number of sub-group data elements of the two or more aggregated sub-group data pairs.

9. The method of claim 1, wherein collecting the balance factor further comprises identifying a ratio value of a number of sub-group data elements of the two or more aggregated sub-group data pairs.

10. The method of claim 1, wherein identifying the final bias further comprises sequentially computing the new bias based on the computed base bias for two or more merged aggregated sub-group data pairs to identify a largest computed new bias.

11. A system, comprising:
    a processor; and
    a memory, wherein the memory includes a computer program product configured to perform operations for implementing self-bias detection, the operations comprising:
    obtaining input data with continuous feature from a data set;
    applying a K-means clustering algorithm to the input data to provide K sub-groups of aggregated sub-group data;
    computing a base bias based on two or more aggregated sub-group data pairs of the K sub-groups of the aggregated sub-group data;
    collecting a scale factor and a balance factor for the two or more aggregated sub-group data pairs;
    computing a new bias based on the computed base bias with a weight based on the scale factor and the balance factor of the two or more aggregated sub-group data pairs;
    identifying a final bias based the computed new bias of the two or more aggregated sub-group data pairs; and
    providing an output of the final bias to a user.

12. The system of claim 11, further comprising:
    sequentially merging adjacent sub-groups of the aggregated sub-group data, applying an updated K value to the K-means clustering algorithm to provide merged aggregated sub-group data; and for two or more merged aggregated sub-group data pairs, sequentially (i) computing the base bias; (ii) collecting the scale factor and collecting the balance factor; and (iii) computing the new bias.

13. The system of claim 12, further comprises identifying the final bias based on a largest value of the computed new bias for the two or more merged aggregated sub-group data pairs.

14. The system of claim 12, wherein each updated K value includes a K'-value with a feature name, and further comprises identifying the K'-value for the final bias; and storing the K'-value with the feature name in a K-value center data store.

15. The system of claim 11, wherein applying the K-means clustering algorithm further comprises providing a specified K-value with a feature name to the K-means clustering algorithm and wherein the specified K-value with the feature name is stored in a K-value center data store.

16. A computer program product for implementing self-bias detection, the computer program product comprising:
   a computer-readable storage medium having computer-readable program code embodied therewith, the computer-readable program code executable by one or more computer processors to perform an operation comprising:
   obtaining input data with continuous feature from a data set;
   applying a K-means clustering algorithm to the input data to provide K sub-groups of aggregated sub-group data;
   computing a base bias based on two or more aggregated sub-group data pairs of the K sub-groups of the aggregated sub-group data;
   collecting a scale factor and a balance factor for the two or more aggregated sub-group data pairs;
   computing a new bias based on the computed base bias with a weight based on the scale factor and the balance factor of the two or more aggregated sub-group data pairs;
   identifying a final bias based the computed new bias of the two or more aggregated sub-group data pairs; and
   providing an output of the final bias to a user.

17. The computer program product of claim 16, further comprising:
   sequentially merging adjacent sub-groups of the aggregated sub-group data, applying an updated K value to the K-means clustering algorithm to provide merged aggregated sub-group data; and for two or more merged aggregated sub-group data pairs, sequentially (i) computing the base bias; (ii) collecting the scale factor and collecting the balance factor; and (iii) computing the new bias.

18. The computer program product of claim 17, further comprises identifying the final bias based on a largest value of the computed new bias for the two or more merged aggregated sub-group data pairs.

19. The computer program product of claim 18, wherein identifying the final bias further comprises identifying a K-value for the final bias; and storing the identified K-value in a K-value center data store.

20. The computer program product of claim 16, wherein applying the K-means clustering algorithm further comprises providing a specified K-value with a feature name to the K-means clustering algorithm and wherein the specified K-value with the feature name is stored in a K-value center data store.

* * * * *